(12) United States Patent
Mahajan et al.

(10) Patent No.: US 8,689,177 B2
(45) Date of Patent: Apr. 1, 2014

(54) INTEGRATION ENVIRONMENT GENERATOR

(75) Inventors: Rahul Mahajan, New Delhi (IN); Dinesh Pandey, Haryana (IN); Stephen Kirkby, Unley Park (AU)

(73) Assignee: Accenture Global Services Limited, Dublin (IE)

( * ) Notice: Subject to any disclaimer, the term of this patent is extended or adjusted under 35 U.S.C. 154(b) by 511 days.

(21) Appl. No.: 12/857,217

(22) Filed: Aug. 16, 2010

(65) Prior Publication Data

US 2011/0055807 A1  Mar. 3, 2011

Related U.S. Application Data

(60) Provisional application No. 61/238,379, filed on Aug. 31, 2009.

(51) Int. Cl.
*G06F 9/44* (2006.01)
*G06F 9/445* (2006.01)

(52) U.S. Cl.
CPC .. *G06F 8/10* (2013.01); *G06F 8/35* (2013.01); *G06F 8/61* (2013.01)
USPC ........... 717/107; 717/110; 717/111; 717/115; 717/121; 717/124

(58) Field of Classification Search
CPC ................ G06F 8/10; G06F 8/35; G06F 8/61
USPC ....................................................... 717/107
See application file for complete search history.

(56) References Cited

U.S. PATENT DOCUMENTS

| 6,289,382 | B1 * | 9/2001 | Bowman-Amuah | .......... 709/226 |
| 6,442,748 | B1 * | 8/2002 | Bowman-Amuah | .......... 717/108 |

(Continued)

FOREIGN PATENT DOCUMENTS

| EP | 1403781 | 3/2004 |
| JP | 09-101871 A | 4/1997 |

(Continued)

OTHER PUBLICATIONS

Tsutomu Hosokawa, "Object-Oriented Design Tools Dramatically Improve Productivity and Quality," Monthly Solution IT, Japan, Ric Telecom, Nov. 1, 2005, vol. 17, No. 11, pp. 60-64.

(Continued)

*Primary Examiner* — Ig T An
(74) *Attorney, Agent, or Firm* — Mannava & Kang, P.C.

(57) ABSTRACT

An integration environment generator receives an input file and converts the input file into a markup language file. The input file identifies modules for an application to be deployed, dependencies among the modules, test cases for testing the modules, and scheduling information. The integration environment generator receives rules and validates the markup language file against the rules. The rules specify a unified format for including the dependencies of the modules in the input file. The integration environment generator identifies the modules, the dependencies among the modules, and the scheduling information and the test cases from the validated markup language file. The integration environment generator selects a build script template for the identified dependencies, a scheduling script template for the identified scheduling information and a test case script template for the identified test cases and generates a build script, a scheduling script and a test case script from the templates.

20 Claims, 6 Drawing Sheets

(56) References Cited

U.S. PATENT DOCUMENTS

| | | |
|---|---|---|
| 2003/0058277 A1* | 3/2003 | Bowman-Amuah .......... 345/765 |
| 2004/0133876 A1* | 7/2004 | Sproule ........................ 717/105 |
| 2004/0177358 A1 | 9/2004 | Narayanaswamy |
| 2005/0071801 A1 | 3/2005 | Jesse et al. |
| 2005/0120347 A1 | 6/2005 | Asare et al. |
| 2005/0193269 A1* | 9/2005 | Haswell et al. ................. 714/38 |
| 2005/0256665 A1* | 11/2005 | Hartmann et al. ............ 702/121 |
| 2006/0041643 A1 | 2/2006 | Fanshier |
| 2006/0059253 A1* | 3/2006 | Goodman et al. ............ 709/223 |
| 2007/0033273 A1* | 2/2007 | White et al. .................. 709/223 |
| 2008/0072100 A1* | 3/2008 | Okada ............................ 714/28 |

FOREIGN PATENT DOCUMENTS

| | | |
|---|---|---|
| JP | 2000137603 A | 5/2000 |
| JP | 2000357082 A | 12/2000 |
| JP | 2004102952 A | 4/2004 |
| JP | 2006106866 A | 4/2006 |
| JP | 2007087127 A | 4/2007 |
| JP | 2007179165 A | 7/2007 |

OTHER PUBLICATIONS

Ryūzō Yamamoto, "Maven2 Best Practice—Internal Repositories, Continuous Integration with Continuum," WEB +DB Press, Japan, Gijutsu-Hyohron Co., Ltd., Jul. 25, 2007, vol. 39, pp. 49-55.

Staelin, Carl, "Mkpkg: A Software Packaging Tool", Internet Citation, Aug. 1998, url:http://www.hpl.hp.com/techreports/97/HPL-97-125R1.pdf.

* cited by examiner

INTEGRATION ENVIRONMENT GENERATOR

PRIORITY

This application claims priority to U.S. provisional patent application Ser. No. 61/238,379, filed on Aug. 31, 2009, and entitled "Build Script Generation", which is incorporated by reference in its entirety.

BACKGROUND

Many applications, which may be Internet applications, business applications, end user applications, etc., are comprised of multiple software modules that perform different functions. For example, an online shopping application may have multiple modules for performing the functions of checking out of a shopping cart. These modules may include a payment module, a validation module and a cart module.

To deploy these modules on a computer system, these modules are created and put together into a deployable package. A deployable package may include a collection of files used to create or update an application. The collection of files may include an executable file and other information that is loaded onto a server or other computer systems. When the executable file is executed, the application, including the modules, may be created or updated.

During the application development phase, the deployable package is built many times and tested. The building of the deployment package can be time consuming and complicated, especially for large applications with many modules and other components. Typically, a developer manually writes or modifies a build script each time there are changes in an application component's dependency or other changes. A build script identifies information, such as dependencies between modules and other information for creating the deployment package. The build script is then used by a conventional build tool to generate the deployment package based on the build script. Manually determining the dependencies between modules and creating or modifying the build script each time the deployment package needs to be created for testing tends to become labor intensive and complex and prone to errors.

SUMMARY OF THE INVENTION

According to an embodiment, an integration environment generator includes an input conversion module, a validation module, a traversal module, a template selection module and a file generation module. The input conversion module is configured to receive an input file and convert the input file into a markup language file, the input file identifying modules for an application to be deployed, dependencies among the modules, test cases for testing the modules, and scheduling information. The validation module is configured to receive rules and validate the markup language file against the rules, the rules specifying a unified format for including the dependencies of the modules in the input file. The traversal module is configured to identify the modules, the dependencies among the modules, the scheduling information and the test cases from the validated markup language file. The template selection module is configured to select a build script template for the identified dependencies among the modules, a scheduling script template for the identified scheduling information and a test case script template for the identified test cases. The file generation module is configured to generate a build script from the build script template, a scheduling script from the scheduling script template and a test case script from the test script template.

According to an embodiment, a method for generating a build script includes receiving an input file and converting the input file into a markup language file, the input file identifying modules for an application, dependencies among the modules, test cases for testing the modules, and scheduling information. The method further includes receiving rules and validating the markup language file against the rules, the rules specifying a unified format for including the dependencies of the modules in the input file. The method also includes identifying the modules, the dependencies among the modules, the scheduling information and the test cases from the validated markup language file; selecting a build script template for the identified dependencies among the modules, a scheduling script template for the identified scheduling information and a test case script template for the identified test cases; and generating a build script from the build script template, a scheduling script from the scheduling script template and a test case script from the test script template. According to an embodiment, the method described above may be embodied in a computer program stored on a non-transitory computer readable medium, which when executed by a computer system performs the method.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Also, the embodiments described herein may be used with each other in various combinations.

1. Overview

According to an embodiment, an integration environment generator is configured to generate build scripts for a deployable package for an application on a computer system. The build scripts are generated from an input file which includes information presented in a unified format that has been validated against a set of rules. The information in the input file identifies dependencies between modules of the application and includes other information required to create a deployment package. The rules specify architectural information regarding the modules and other elements and are used to validate the input file. The integration environment generator is also configured to generate scheduling scripts which indicate when and how often a build script and a deployment package are to be generated.

During the application development phase, many software developers may work together to create and test the application. Developers may increase their efficiency by utilizing tools to perform various tasks. For example, continuous integration is the process of performing system builds at regular intervals while developers are changing application code. Through the process of continuous integration, developers can ensure the altered application code is compatible with code developed by other developers. To ensure the compatibility of the altered application code and the code developed by the other developers, the integration environment generator also generates test case scripts to test dependencies of modules encoded in the altered application code.

Thus, the integration environment generator aids developers by creating build scripts and scheduling scripts regularly so that the changes made to the application code are compiled and regularly tested against the other parts of the application.

2. System

Figure 1:
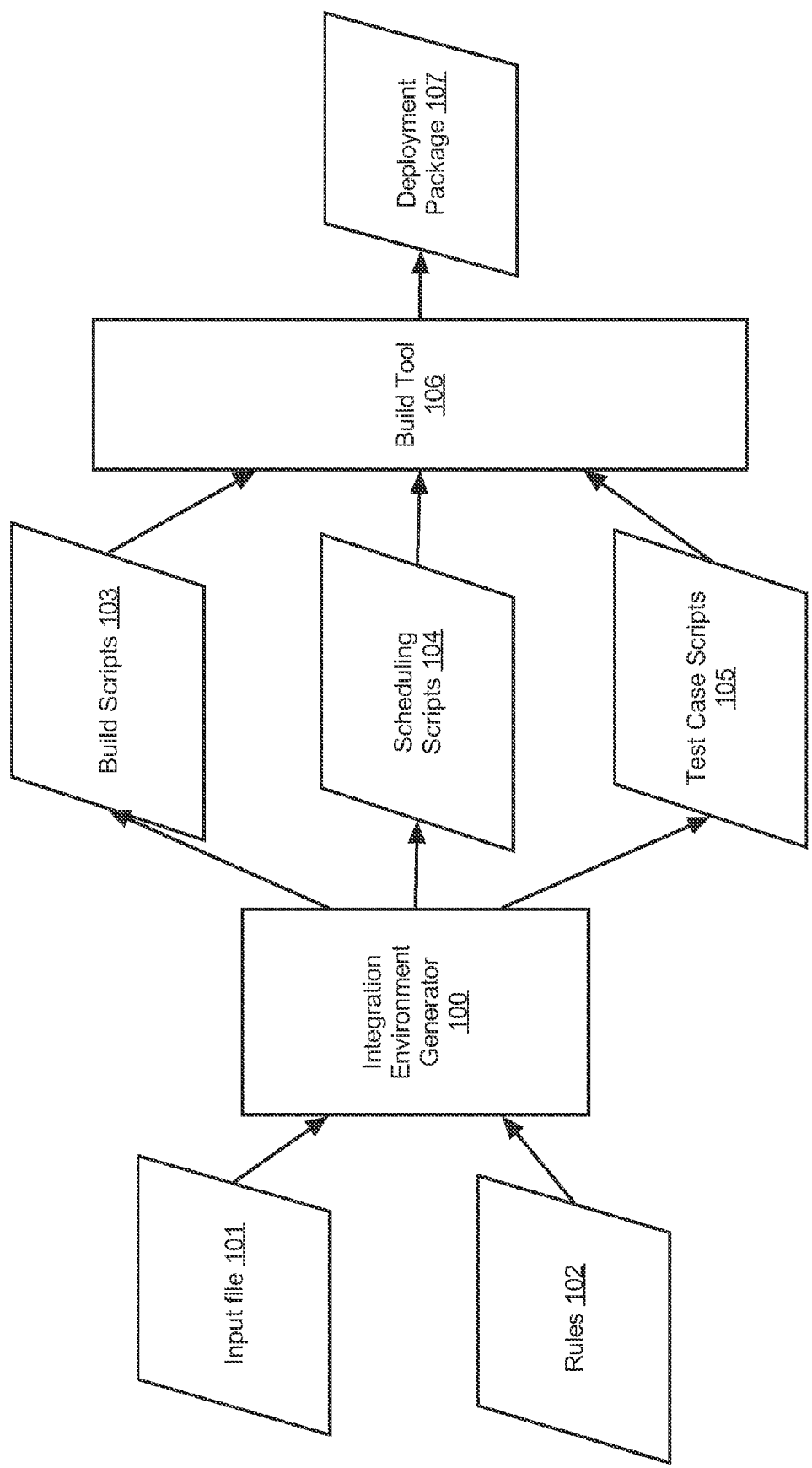
FIG. 1 illustrates a system diagram of an integration environment generator, according to an embodiment.

FIG. 1 illustrates an integration environment generator 100, according to an embodiment. The integration environment generator 100 accepts as input an input file 101 and rules 102.

In one embodiment, the input file 101 is a Unified Modeling Language (UML) file, however, other formats or languages may be used for the input file 101. UML is a standardized modeling language that may be used to create visual models of applications. The input file 101 may include a UML design that provides information used to create an application. The UML design may identify elements of the application. The elements may include business processes, users, software components, activities, etc. The UML design also identifies modules of the application and dependencies among the modules. The UML design further includes scheduling information indicating when and how often to create a deployment package, as well as test cases to test the dependencies among the modules.

The rules 102 specify architectural information regarding the modules and other elements and are used to validate the input file 101. The rules 102 may specify a format or syntax for the information included in the input file 101. The rules 102 may specify the dependencies are to be pictorially represented using particular symbols and locations for providing the symbols based on their dependencies. Examples of other rules 102 include the dependencies among the various modules are not to be cyclic; the dependencies among the various modules are to be unidirectional; the dependencies among the various modules are to be specified by <<use>> stereotype of UML; the modules are to be specified using UML component notation; and the final two letters in an application component's name are reserved and form a module abbreviation which helps to map the application component to a respective module. The rules 102 also specify scheduling requirements. For example, as scheduling information is specified by giving a value to an attribute <<scheduleTimePeriodIn Hours>> of Stereotype <<AbstractCommonLayer>>. The rules 102 further specify requirements for test cases including the test cases are to be specified by giving values to an attribute <<testCaseId>> on every modeled method using UML notation.

The integration environment generator 100 outputs build scripts 103, scheduling scripts 104 and test case scripts 105. The build scripts 103 are scripts used to build deployment packages. A build script identifies information, such as dependencies between modules and other information for creating the deployment package. For example, the build script 103 is used by build tool 106 to generate a deployment package 107. The build tool 106 may be an off-the-shelf software tool. The scheduling scripts 104 are scripts generated by the integration environment generator 100 to identify when and how often the build scripts and the deployment packages are to be generated. For example, the scheduling scripts 104 may indicate that a deployment package is to be built daily at 9 PM over every 6 hours, so any modifications made to modules encoded in the application code are captured in daily builds. The test case scripts 105 are scripts that test dependencies among the modules. The test case scripts 105 indicate tests that are to be performed on particular modules, and may also indicate how the tests are linked.

Figure 2:
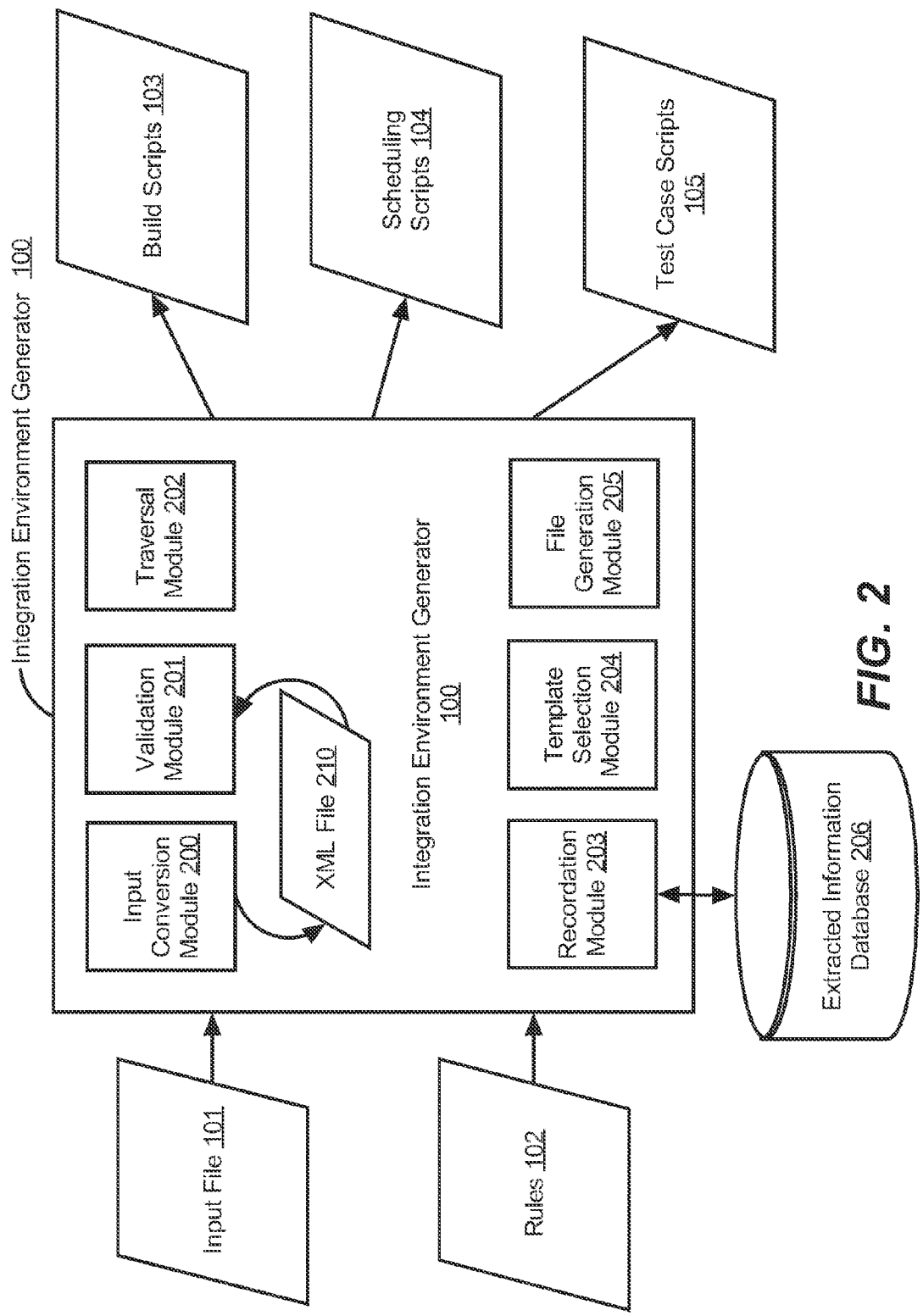
FIG. 2 illustrates a more detailed system diagram of the integration environment generator, according to an embodiment.

FIG. 2 illustrates a more detailed system diagram of the integration environment generator 100. The integration environment generator 100 includes an input conversion module 200, a validation module 201, a traversal module 202, a recordation module 203, a template selection module 204 and a file generation module 205. The modules 200-205 may be software modules, hardware or a combination of software and hardware.

The input conversion module 200 accepts an input file 102 as input to the integration environment generator 100. As discussed above, the input file 101 may include a UML design that provides information used to create an application. The UML design may identify elements of the application. The elements may include business processes, users, software components, activities, etc. The UML design also identifies the modules of the application to be built or updated and deployed and dependencies among the modules. The UML design in the input file 101 is saved as a UML metamodel. The UML metamodel is a data model representing the elements of the application. To further process the UML design of the input file 101, the input conversion module 200 may convert the UML metamodel of the UML design to an XML file 210, or other markup language file, using conventional tools and techniques.

The validation module 201 accepts the rules 102 as an input to the integration environment generator 100. As discussed above, the rules 102 specify architectural information regarding the modules and other elements. For example, the rules 102 may specify a format or syntax for the information included in the input file 101. The validation module 102 also receives the XML file 210 from the input conversion module 200. The validation module 201 validates the XML file 210 against the rules 102. The validation module 201 ensures the XML file 210 complies with the rules 102. Examples of rules 102 include the dependencies among the various modules are not to be cyclic; the dependencies among the various modules are to be unidirectional; the dependencies among the various modules are to be specified by <<use>> stereotype of UML; the modules are to be specified using UML component notation; and the final two letters in an application component's name are reserved and form a module abbreviation which helps to map the application component to a respective module. The rules 102 also specify scheduling requirements and test case requirements.

The traversal module 202 traverses the XML file 210 to identify the modules, dependencies among the modules, and scheduling information and test cases from the validated XML file 210. The validated XML file 210 may be parsed to identify this information.

The recordation module 203 stores an indication of the identified modules, the dependencies among the modules, the scheduling information and the test cases from the XML file 210 in an extracted information database 206 or other data store. The dependencies among the modules, the scheduling information and the test cases are associated with the XML file 210 from which they were identified when the information is stored, for example, in the extracted information database 206.

Based on the stored dependencies identified among the modules, the recordation module 203 also generates a tree structure to reflect the dependencies of the modules in a machine understandable format. The tree structure is also stored in the extracted information database 206 in connection to the XML file 210 from which the dependencies among the modules were identified.

The template selection module 204 identifies a template of a plurality of templates for the dependencies among the modules, the scheduling information and the test cases stored in the extracted information database 206. The plurality of templates are customizable and are software architecture specific. The plurality of templates have placeholders in a specified structure. Three types of templates exist including build script templates, scheduling script templates and test case script templates. Of course, there may be more types of templates. The build script templates are used to create the build script 103. The scheduling script templates are used to create the scheduling script 104, and the test case script templates are used to create the test case scripts 105.

The template selection module 204 retrieves information for the XML file 210 from the extracted information database 206. Based on the retrieved information, the template selection module 204 selects a template of the plurality of templates to populate. For example, when the input file 101 is converted to an XML file 210, the dependencies among the modules, the scheduling information and the test cases corresponding to the XML file are saved in the extracted information database 206. Once the dependencies among the modules, the scheduling information and the test cases are retrieved, the template selection module 204 selects a build script template for the retrieved dependencies. The template selection module 204 also selects a scheduling script template for the scheduling information and a test case script template for the test cases. The template selection module 204 populates the build script template with the retrieved dependencies among the modules, the scheduling script template with the scheduling information and the test case script template with the test cases. For example, the placeholders in the templates are replaced with actual UML element attributes.

The file generation module 205 generates the output files including the build script 103, the scheduling script 104 and the test case script 105 based on the build script template, the scheduling script template and the test case script template, respectively.

A deployment package build tool (not shown) uses the scripts to create a deployment package, which is then deployed on a computer system. The deployment package build tool may be a conventional, off-the-shelf build tool for creating the deployment package.

3. Examples

Figure 3:
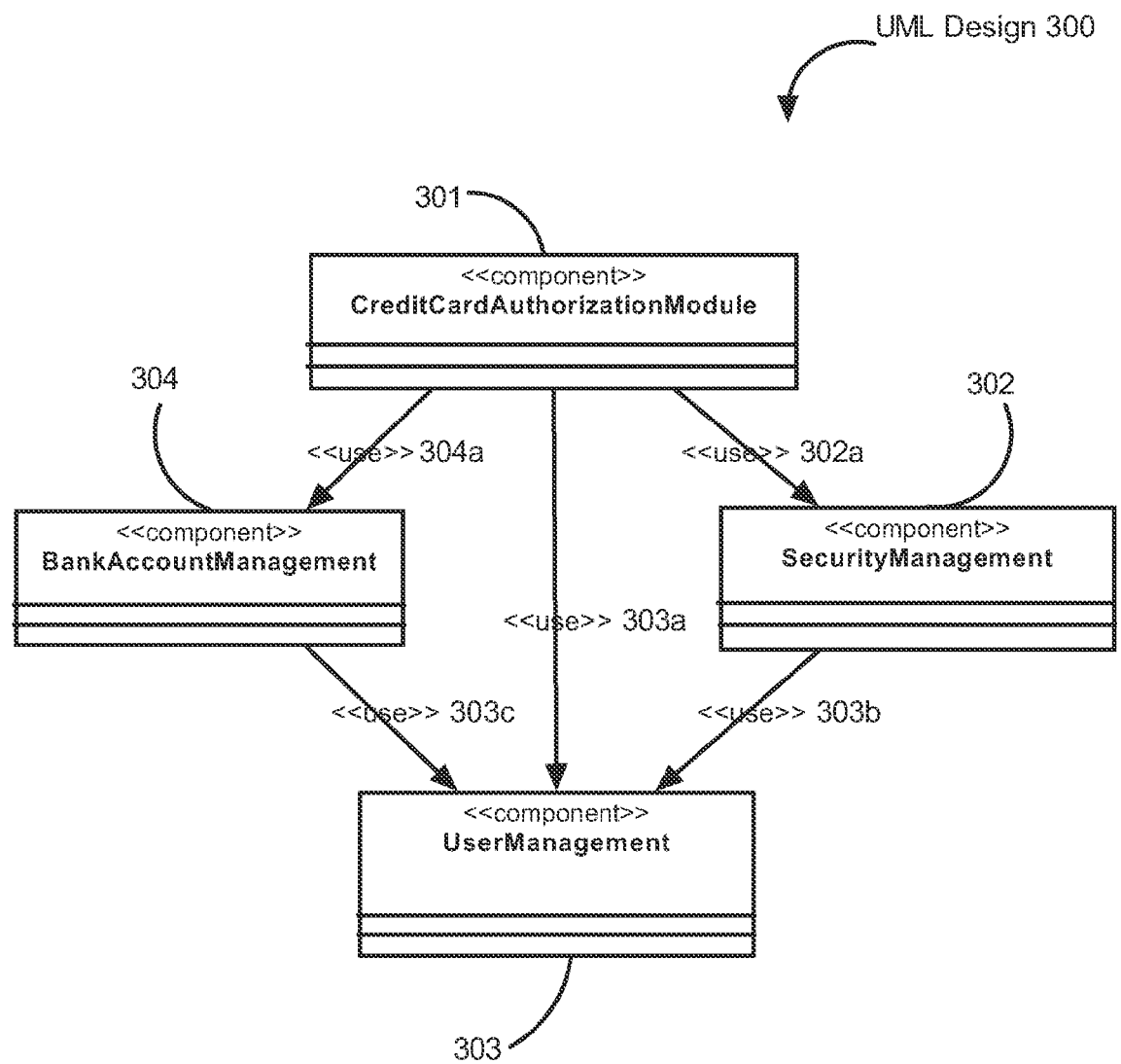
FIG. 3 illustrates an example of a UML design, according to an embodiment.

FIG. 3 illustrates an example of a UML design, according to an embodiment. As discussed above, with reference to FIG. 1, the input file 101 may be a Unified Modeling Language (UML) file. The input file 101 may include a UML design 300 that provides information used to create an application. The UML design 300 may identify elements of the application. The elements may include business processes, users, software components, activities, etc. In FIG. 3, four modules 301-304 are identified by the <<component>> stereotype in UML. The module 301 is entitled "CreditCardAuthorizationModule", the module 302 is entitled "SecurityManagement", the module 303 is entitled "UserManagement" and the module 304 is entitled "BankAccountManagement".

The UML design 300 also identifies dependencies among the modules 301-304 by the <<use>> stereotype. For example, the module 301 is dependent upon the modules 302, 303 and 304, shown by <<use>> stereotypes 302a, 303a and 304a and the directionality of the arrows. Moreover, the modules 302 and 304 are dependent upon the module 303, as shown by <<use>> stereotypes 303b and 303c and the directionality of the arrows.

Figure 4:
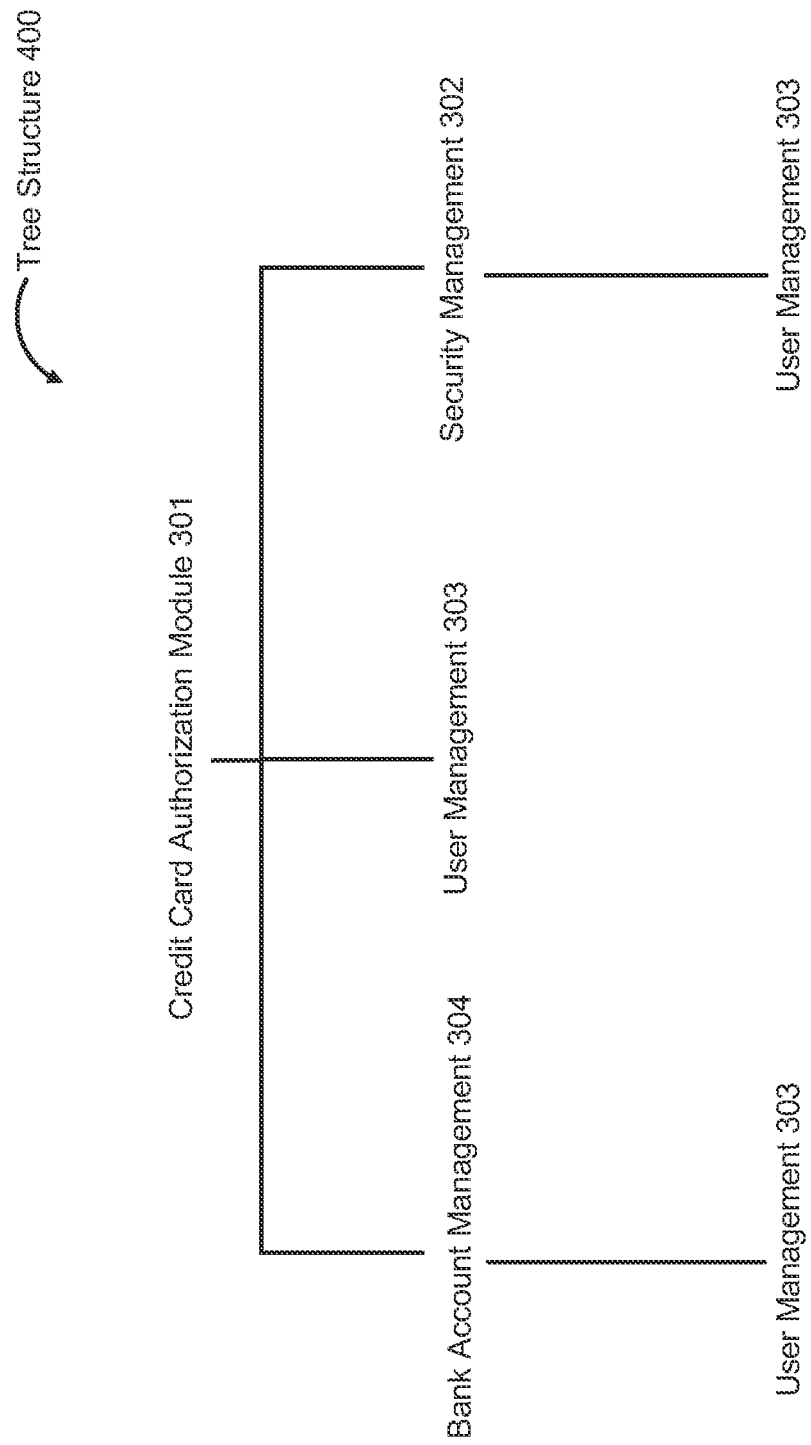
FIG. 4 illustrates an example of a tree structure, according to an embodiment.

FIG. 4 illustrates a tree structure 400 reflecting the dependencies of the modules 301-304 in FIG. 3. As discussed above, based on the stored dependencies identified among the modules 301-304, a tree structure 400 is generated to reflect the dependencies of the modules in a machine understandable format.

4. Method

Figure 5:
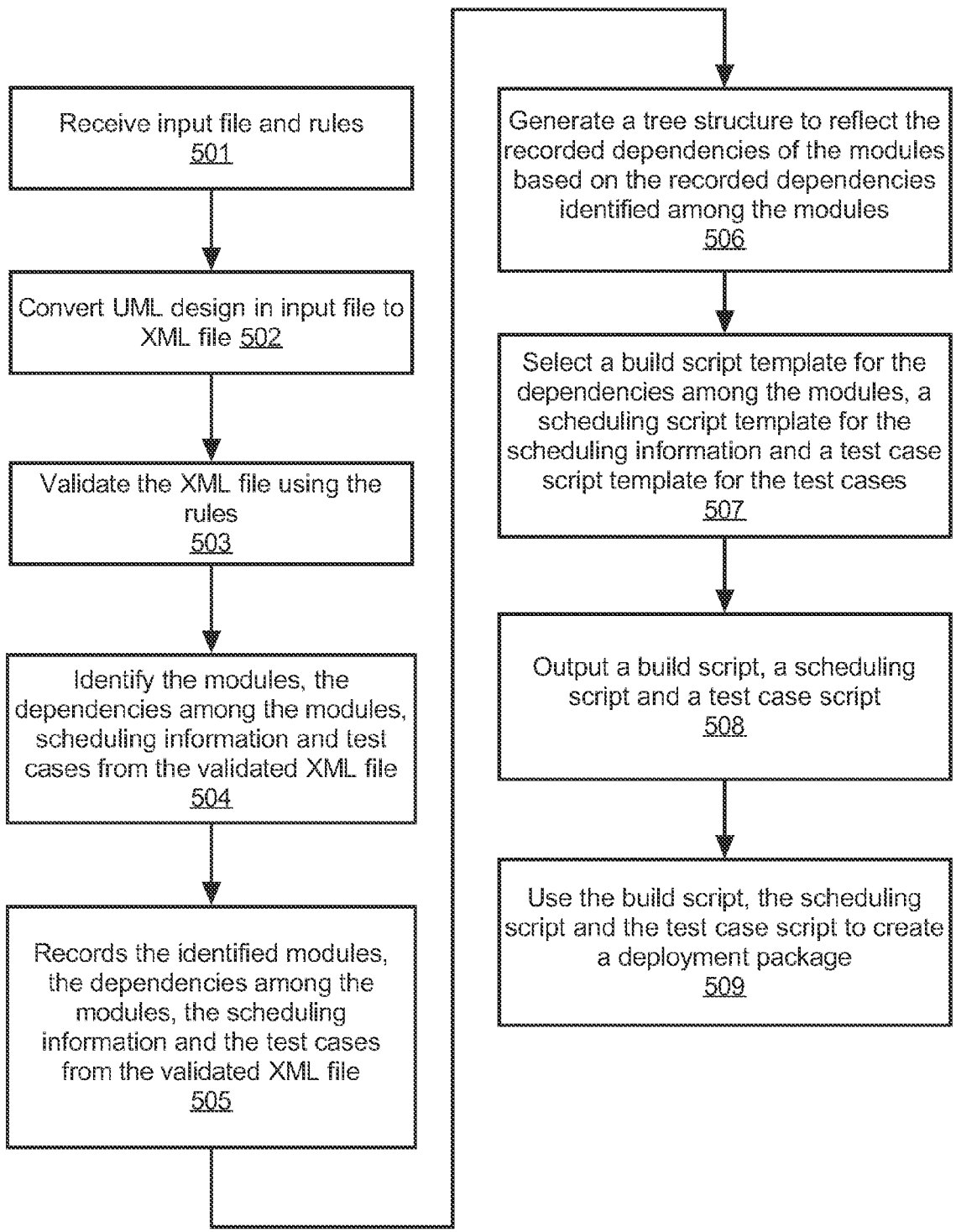
FIG. 5 illustrates a method for generating a deployment package, according to an embodiment.

FIG. 5 illustrates a method 500, according to an embodiment. The method 500 and other steps described herein may be described with respect to FIGS. 1 and 2 by way of example and not limitation.

At step 501, the integration environment generator 100 receives an input file, such as input file 101. As discussed above, the input file may include a UML design that provides information used to create an application. The UML design may identify elements of the application. The elements may include business processes, users, software components, activities, etc. The UML design also identifies modules of the application and dependencies among the modules. The UML design in the input file is saved as a UML metamodel. The UML metamodel is a data model representing the elements of the application.

Also at step 501, the integration environment generator 100 receives rules, such as rules 102, as another input to the integration environment generator 100. As discussed above, the rules specify architectural information regarding the modules and other elements.

At step 502, the integration environment generator 100, converts the UML design to an XML file. The UML design in the input file is saved as a UML metamodel. The UML metamodel is a data model representing elements of the application. The UML metamodel is converted to an XML file using conventional tools and techniques. Instead of XML, other formats may be used. Also, instead of UML other formats may be used for the input file. If the input file is provided in XML then the step 502 is not performed.

At step 503, the integration environment generator 100 validates the XML file created at step 501 against the rules to ensure the XML file complies with the rules.

At step 504, the integration environment generator 100 traverses the XML file and identifies the modules, the dependencies among the modules, scheduling information and test cases from the validated XML file. For example, the validated XML file is parsed to identify the modules, the dependencies among the modules, scheduling information and test cases.

At step 505, the integration environment generator 100 stores an indication of the identified modules, the dependencies among the modules, the scheduling information and the test cases from the XML file in an extracted information database or other data store. The dependencies among the modules, the scheduling information and the test cases are stored in connection to the XML file from which they were identified.

At step 506, based on the stored dependencies identified among the modules, a tree structure is generated to reflect the dependencies of the modules. The tree structure is also stored in the extracted information database in connection to the XML file from which the dependencies among the modules were identified.

At step 507, the integration environment generator 100 identifies a template of a plurality of templates for the dependencies among the modules, the scheduling information and the test cases stored in the extracted information database. The plurality of templates may include a build script template, a scheduling script template and a test case script template. The build script template is used to create a build script. The scheduling script template is used to create a scheduling script. The test case script template is used to create a test case script. The information for the XML file is retrieved from the extracted information database. Based on the retrieved information, a template of the plurality of templates is selected to populate. For example, when the input file is converted to an XML file, the dependencies among the modules, the scheduling information and the test cases corresponding to the XML file are saved in the extracted information database. Once the dependencies among the modules, the scheduling information and the test cases are retrieved, a build script template is selected for the retrieved dependencies among the modules. The integration environment generator 100 also selects a scheduling script template for the scheduling information and a test case script template for the test cases. The build script template is then populated with the retrieved dependencies among the modules, the scheduling script template is populated with the scheduling information and the test case script template is populated with the test cases.

At step 508, the integration environment generator 100 outputs files including the build script, the scheduling script and the test case script based on the build script template, the scheduling script template and the test case script template, respectively.

At step 509, a deployment package build tool uses the scripts to create a deployment package, which is then deployed on a computer system. The deployment package build tool may be a conventional, off-the-shelf build tool for creating the deployment package.

5. Computer System

Figure 6:
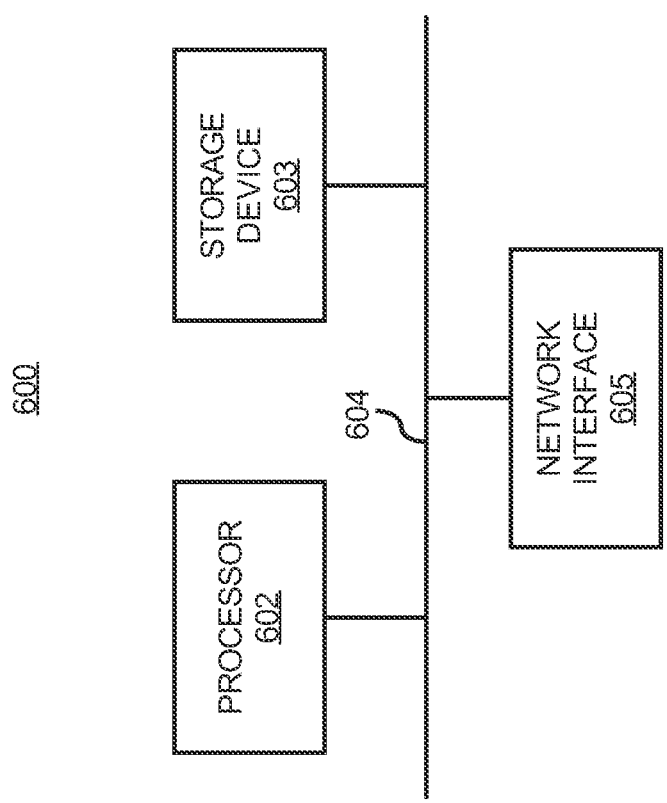
FIG. 6 illustrates a computer system operating as a hardware platform for the integration environment generator described herein, according to an embodiment.

FIG. 6 shows a computer system 600 that may be used as a hardware platform for the integration environment generator 100. The computer system 600 may be used as a platform for executing one or more of the steps, methods, and functions described herein that may be embodied as software stored on one or more non-transitory computer readable mediums, such as storage devices.

The computer system 600 includes a processor 602 or processing circuitry that may implement or execute software instructions performing some or all of the methods, functions and other steps described herein. Commands and data from the processor 602 are communicated over a communication bus 604. The computer system 600 also includes a non-transitory computer readable storage device 603, such as random access memory (RAM), where the software and data for processor 602 may reside during runtime. The storage device 603 may also include non-volatile data storage. The computer system 600 may include a network interface 605 for connecting to a network. It will be apparent to one of ordinary skill in the art that other known electronic components may be added or substituted in the computer system 600.

While the embodiments have been described with reference to examples, those skilled in the art will be able to make various modifications to the described embodiments without departing from the scope of the claimed embodiments. Also, the embodiments described herein may be used to create scripts for any environment such as a real-time environment.

What is claimed is:

1. An integration environment generator comprising:
a processor and a memory storing machine readable instructions executable by the processor to implement:
an input conversion module to receive an input file and convert the input file into a markup language file, the input file identifying modules for an application to be deployed, dependencies among the modules, test cases for testing the modules, and scheduling information;
a validation module to receive rules and validate the markup language file against the rules, the rules specifying a unified format for including the dependencies of the modules in the input file;
a traversal module to identify the modules, the dependencies among the modules, the scheduling information and the test cases from the validated markup language file;
a template selection module to select a build script template for the identified dependencies among the modules, a scheduling script template for the identified scheduling information and a test case script template for the identified test cases by identifying each template from a plurality of templates; and
a file generation module to generate a build script from the build script template, a scheduling script from the scheduling script template and a test case script from the test case script template, the template selection module to populate:
the build script template with the identified dependencies among the modules;
the scheduling script template with the identified scheduling information; and
the test case script template with the identified test cases.

2. The integration environment generator of claim 1, further comprising a recordation module to generate a tree structure reflecting the dependencies among the modules.

3. The integration environment generator of claim 1, wherein the markup language file is an XML file.

4. The integration environment generator of claim 1, wherein the build script is to create a deployable package.

5. The integration environment generator of claim 1, wherein the input file includes a Unified Modeling Language (UML) design.

6. The integration environment generator of claim 1, wherein the rules include a rule specifying that dependencies among the various modules are not to be cyclic.

7. The integration environment generator of claim 1, wherein the rules include a rule specifying that dependencies among the various modules are to be specified by <<use>> stereotype of Unified Modeling Language (UML).

8. A method for generating a build script, the method comprising:
converting, by a processor, an input file into a markup language file, the input file identifying modules for an application, dependencies among the modules, test cases for testing the modules, and scheduling information;

validating the markup language file against rules, the rules specifying a unified format for including the dependencies of the modules in the input file;

identifying the modules, the dependencies among the modules, the scheduling information and the test cases from the validated markup language file;

selecting a build script template for the identified dependencies among the modules, a scheduling script template for the identified scheduling information and a test case script template for the identified test cases by identifying each template from a plurality of templates; and generating, by the processor, a build script from the build script template, a scheduling script from the scheduling script template and a test case script from the test case script template, wherein the build script template is populated with the identified dependencies among the modules, wherein the scheduling script template is populated with the identified scheduling information, and wherein the test case script template is populated with the identified test cases.

9. The method of claim 8, further comprising:
generating a tree structure reflecting the dependencies among the modules.

10. The method of claim 8, wherein the markup language file is an XML file.

11. The method of claim 8, wherein the build script is used to create a deployable package.

12. The method of claim 8, wherein the input file includes a Unified Modeling Language (UML) design.

13. The method of claim 8, wherein the rules include a rule specifying the dependencies among the various modules are not to be cyclic.

14. The method of claim 8, wherein the rules include a rule specifying the dependencies among the various modules are to be specified by <<use>> stereotype of Unified Modeling Language (UML).

15. A non-transitory computer readable medium having stored thereon computer executable instructions for generating a build script, the computer executable instructions, when executed, cause a computer system to perform a method comprising:

converting an input file into a markup language file, the input file identifying modules for an application, dependencies among the modules, test cases for testing the modules, and scheduling information;

validating the markup language file against rules, the rules specifying a unified format for including the dependencies of the modules in the input file;

identifying the modules, the dependencies among the modules, the scheduling information and the test cases from the validated markup language file;

selecting a build script template for the identified dependencies among the modules, a scheduling script template for the identified scheduling information and a test case script template for the identified test cases by identifying each template from a plurality of templates; and generating a build script from the build script template, a scheduling script from the scheduling script template and a test case script from the test case script template, wherein the build script template is populated with the identified dependencies among the modules, wherein the scheduling script template is populated with the identified scheduling information, and wherein the test case script template is populated with the identified test cases.

16. The computer readable medium of claim 15, wherein the method further comprises:
generating a tree structure reflecting the dependencies among the modules.

17. The computer readable medium of claim 15, wherein the markup language file is an XML file.

18. The computer readable medium of claim 15, wherein the build script is used to create a deployable package.

19. The computer readable medium of claim 15, wherein the input file includes a Unified Modeling Language (UML) design.

20. The computer readable medium of claim 15, wherein the rules include a rule specifying the dependencies among the various modules are not to be cyclic.

* * * * *